United States Patent [19]

Omoda et al.

[11] Patent Number: 4,825,361
[45] Date of Patent: Apr. 25, 1989

[54] VECTOR PROCESSOR FOR REORDERING VECTOR DATA DURING TRANSFER FROM MAIN MEMORY TO VECTOR REGISTERS

[75] Inventors: Koichiro Omoda, Sagamihara; Shunichi Torii, Musashino; Shigeo Nagashima, Hachioji; Yasuhiro Inagami; Takayuki Nakagawa, both of Hadano, all of Japan

[73] Assignee: Hitachi, Ltd., Tokyo, Japan

[21] Appl. No.: 21,590

[22] Filed: Mar. 2, 1987

Related U.S. Application Data

[63] Continuation of Ser. No. 544,135, Oct. 21, 1983, abandoned.

[30] Foreign Application Priority Data

Oct. 22, 1982 [JP] Japan .............................. 57-184553

[51] Int. Cl.⁴ .......................................... G06F 15/347
[52] U.S. Cl. ..................................... 364/200; 364/736
[58] Field of Search ... 364/200 MS File, 900 MS File, 364/736, 738, 748

[56] References Cited

U.S. PATENT DOCUMENTS

| | | | |
|---|---|---|---|
| 3,573,851 | 4/1971 | Watson et al. | 364/200 |
| 3,585,608 | 6/1971 | Osborne | 364/900 |
| 3,794,984 | 2/1974 | Deerfield et al. | 364/200 |
| 3,812,473 | 5/1974 | Tucker | 364/200 |
| 3,827,031 | 7/1974 | Kastmer et al. | 364/200 |
| 3,919,534 | 11/1975 | Hutson et al. | 364/900 |
| 4,128,880 | 12/1978 | Cray, Jr. | 364/200 |
| 4,172,287 | 10/1979 | Kawabe et al. | 364/736 |
| 4,293,941 | 10/1981 | Muraoka et al. | 364/200 |
| 4,435,765 | 3/1984 | Uchida et al. | 364/200 |
| 4,490,786 | 12/1984 | Nakatani | 364/200 |
| 4,621,324 | 11/1986 | Ushiro et al. | 364/200 |
| 4,661,900 | 4/1987 | Chen et al. | 364/200 |

OTHER PUBLICATIONS

IBM 3838 Array Processor Functional Characteristics; 1977, pp. 5, 9 and 19–20.

Primary Examiner—Gary V. Harkcom
Assistant Examiner—Christopher H. Lynt
Attorney, Agent, or Firm—Antonelli, Terry & Wands

[57] ABSTRACT

A vector processor having a vector register made up of elements of $l_2$-byte size for storing vector data made up of a plurality of elements read out from a main storage which has a plurality of storage areas and is capable of reading out data of $l_1$-byte size beginning from a specified address bound, and adapted to write vector data with an element size of m ($l_1/m$ is an integer and $l_2$ is larger or equal to m) into the vector register sequentially, read-out vector data from the vector register for computation by an arithmetic unit, and write the computational result into the vector register, wherein the processor writes elements of vector data read out from the main storage into separatte, specified locations of the vector register in an order required for subsequent operations.

10 Claims, 11 Drawing Sheets

FIG. I (PRIOR ART)
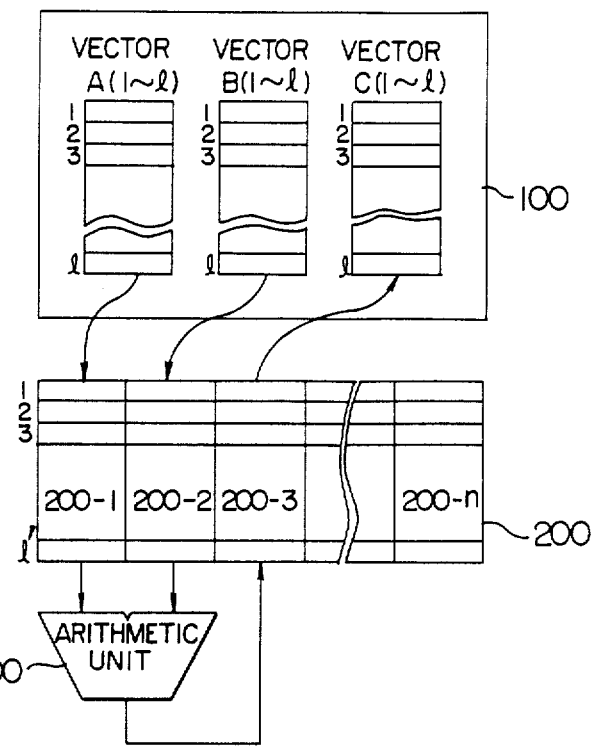
FIG. 5
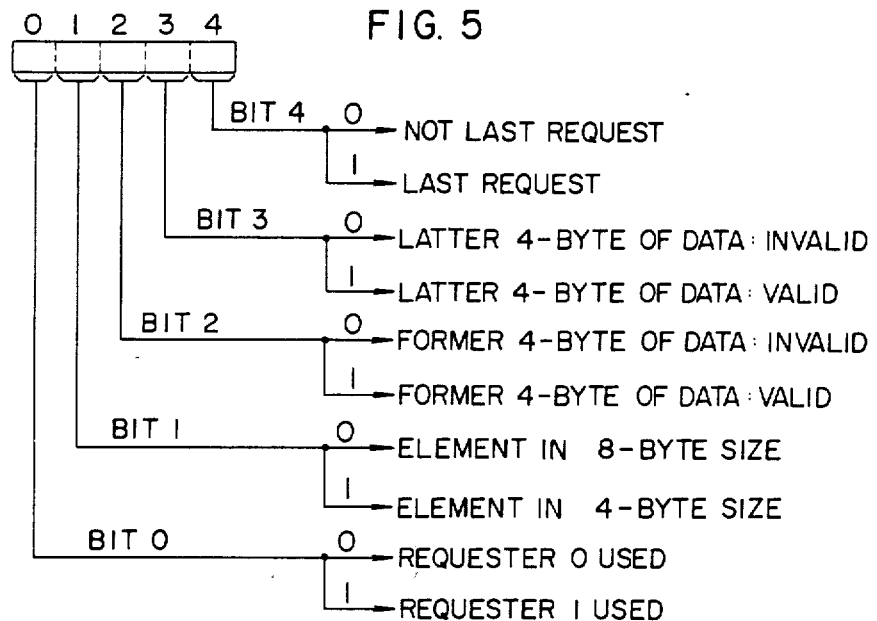

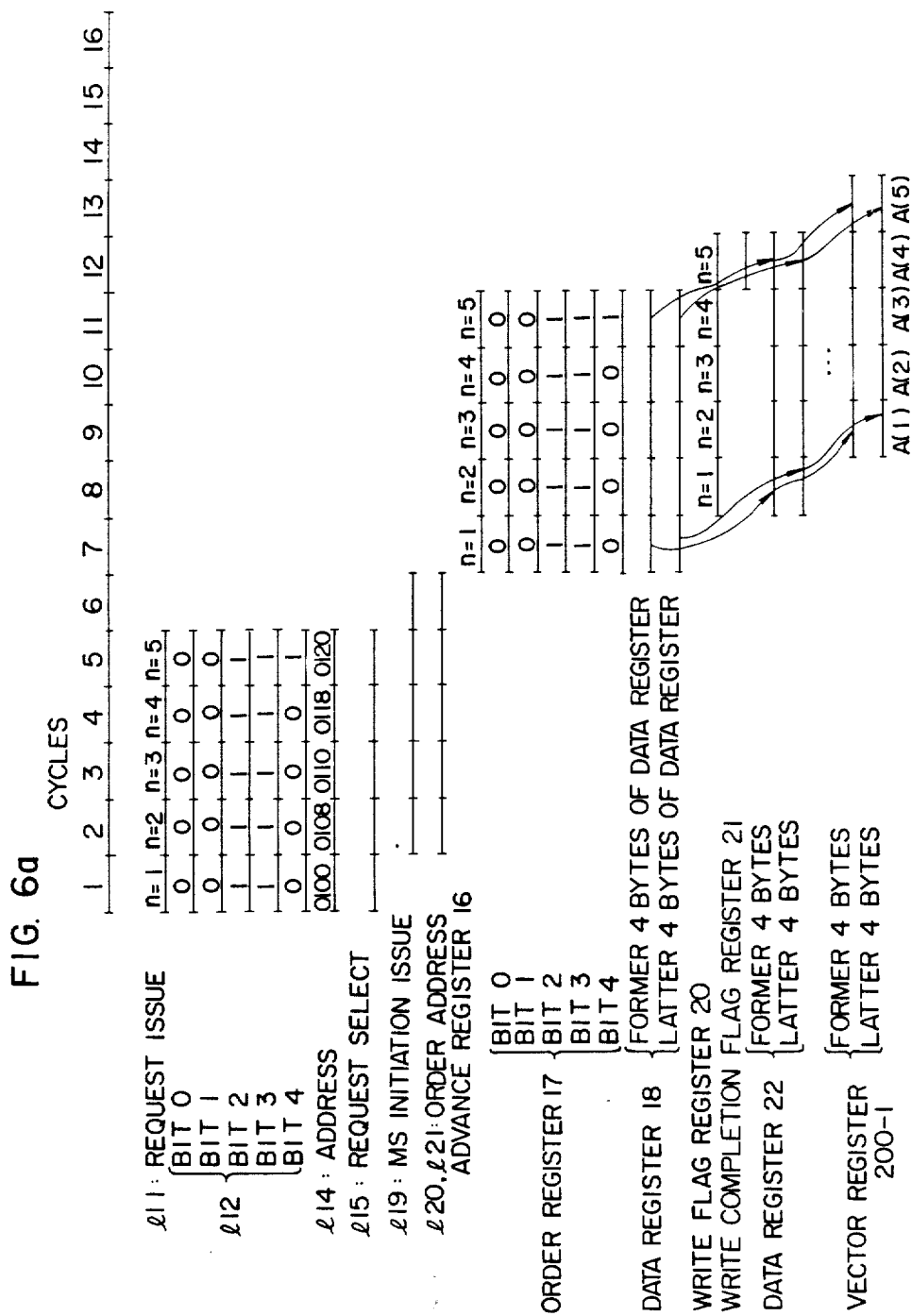

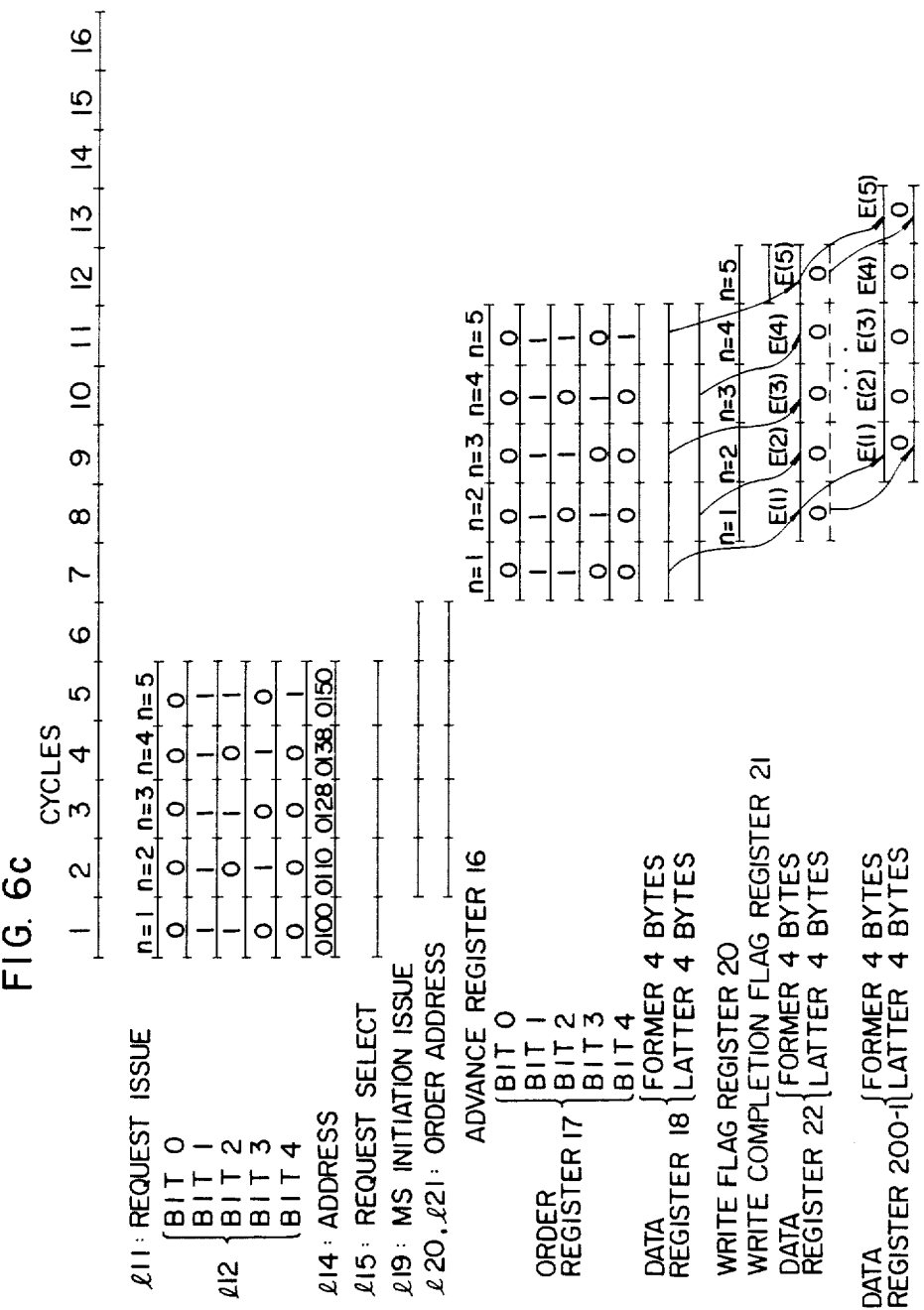

FIG. 10

| | | | INCREMENT MULTIPLE GENERATOR | |
|---|---|---|---|---|
| | | | FIRST REQUEST (REGISTER 305=1) | SECOND AND LATER REQUEST (REGISTER 305=0) |
| VECTOR DATA ELEMENT IN 8-BYTE SIZE (REGISTER 302=0) | | | MULTIPLE : 0 | MULTIPLE : 1 |
| VECTOR DATA ELEMENT IN 4-BYTE SIZE (REGISTER 302=1) | INCREMENT : 4 (REGISTER 303=1) | LEADING ELEMENT ADDRESS : 4-BYTE BOUND (REGISTER 304=1) | MULTIPLE : -1 | MULTIPLE : 2 |
| | | LEADING ELEMENT ADDRESS : 8-BYTE BOUND (REGISTER 304=0) | MULTIPLE : 0 | MULTIPLE : 2 |
| | INCREMENTS OTHER THAN 4 (REGISTER 303=0) | | MULTIPLE : 0 | MULTIPLE : 1 |

VECTOR PROCESSOR FOR REORDERING VECTOR DATA DURING TRANSFER FROM MAIN MEMORY TO VECTOR REGISTERS

This application is a continuation of application Ser. No. 544,135, filed Oct. 21, 1983, now abandoned.

BACKGROUND OF THE INVENTION

The present invention relates to a vector processor capable of fast vector computation and, particularly, to a vector processor with simplified control for writing vector data into the vector register so as to perform vector processing at a high speed.

A vector processor has a main storage for storing vector data and a vector register for storing vector data read out from the main storage. The main storage and vector register are accessible for reading and writing data by specification of a bit position in each word. The specified bit position for reading or writing is called an "address bound". The main storage and address register can store data of a plurality of byte widths.

In case of data stored in the main storage in $l_1$-byte width, data stored in the address register in $l_2$-byte width, and a vector element in m-byte width, a relationship is assumed in that $l_1/m$ is an integer and $l_2$ is larger than or equal to m. In the vector processor, vector data stored in the main storage is read out by specifying its address bound, the element is stored in the vector register, the vector data is transferred from the vector register to an arithmetic unit for computation, and the computational result is stored in the vector register.

In the prior art vector processor having two arithmetic units with each word of the vector register including two vector data elements to be processed by separate arithmetic units, e.g., arithmetic unit 0 and arithmetic unit 1, it is necessary to determine which arithmetic unit is to be used for processing each vector data element included in each word of the vector register and to input each vector data element to a certain arithmetic unit depending on the determination, causing the control circuit to be complex and requiring a long vector computation time due to complicated control for the frequent data transfer from the vector register to the arithmetic units. Referring to FIG. 2(e), showing an example of data element arrangement in the main storage of the conventional vector processor, vector data elements arranged in a main storage 100 are put into a vector register 200-1 as shown in the figure. In the figure, each word of the vector register 200-1 has an 8-byte width or size, while data such as F(1) and F(2) have a data size of 4 bytes, and data F(1), F(3) and F(5) are to be entered to one arithmetic unit, while data F(2) and F(4) are to be entered to another arithmetic unit. In transferring vector data from the vector register 200-1 to the arithmetic unit, it is necessary to determine whether an effective vector data F(l) resides in the right-hand or left-hand 4 bytes of an 8-byte word which has been read out as the first word from the vector register, and also to determine which arithmetic unit is to be used for the computation of the data F(1). For the second word, it is necessary to determine which arithmetic unit is to be used for each of data F(1) and F(2) in the word read out of the vector register. The same determinative process is required for the following words. FIG. 2(f) also shows an example of the data element arrangement in the conventional vector processor using two arithmetic units. In FIG. 2(f), vector data elements arranged in the main memory 100 as shown in the figure are placed in the vector register 200-1 as shown in the figure. Also in this case, each word of the vector register 200-1 has an 8-byte size and data such as G(1) and G(2) are in a 4-byte size. Data G(1), G(3) and G(5) are to be entered to one arithmetic unit, while data G(2) and G(4) are to be entered to another arithmetic unit. Also in the case of FIG. 2(f), in transferring vector data elements in the vector register 200-1 to an arithmetic unit 300, it is necessary to determine whether an effective vector data element resides in the right-hand or left-hand 4 bytes of an 8-byte word read out from the vector register 200-1, and to determine which arithmetic unit is to receive the effective data.

In both cases of FIG. 2(e) and FIG. 2(f), a complex control circuit is needed for the determination of data transfer from the vector register to the arithmetic units, and extra time is required for a complicated control in transferring data from the vector register to the arithmetic unit, resulting disadvantageously in a lengthy vector computation time.

In a conventional vector processor, where a single arithmetic unit is used for each word of the vector register, vector data cannot be processed if a plurality of vector elements of the vector data are stored in one data area of the memory.

By application of technology for determining which vector data element in each word from the vector register is to be entered to which one of the arithmetic units in the conventional vector processor using two arithmetic units, an attempt may be made to solve the problem in the case of using a single arithmetic unit as mentioned above. However, this poses the following problem. Namely, one possible way in reading out vector data stored in the main storage and writing the data into the vector register is to write vector data elements into the vector register without changing the arrangement in the main storage. In this case, however, it becomes necessary for vector data elements arranged in words from the vector register to be rearranged in positions suitable for the process by the arithmetic unit before they are inputted to the arithmetic unit. For example, when the vector register has 8-byte words with a vector data element of 4-byte length placed in the right-hand 4-bytes of the word and the arithmetic unit requires the input word format in the arrangement of left-to-right order, a vector data element in the word read out from the vector register needs the rearrangement of shifting it to the left-hand side of the word. In another example in which each vector element has a different arrangement position in a word of the vector register, as in case where, for example, a plurality of vector data elements exist continuously within a word, rearrangement must be made differently for each vector element. Therefore, a decision process for determining the rearrangement of vector data elements is needed, that requires a complex control circuit, and moreover, it takes a longer time to transfer vector data from the vector data register to the arithmetic unit. In vector computation, read-out of vector data from the main storage to the vector register is followed by frequent transfer of vector data and results between the vector register and arithmetic unit, resulting disadvantageously in a lengthy vector computation time due to the rearrangement for a vector data element and the determination of the rearrangement each time a vector data element is transferred from the vector register to the arithmetic unit, and in a complex control circuit for the determination.

The above problems will further be detailed in the following. FIG. 1 illustrates the process of vector computation by a vector processor. The arrangement shown in the figure includes a main storage 100, vector register group 200, vector registers 200-1 through 200-n each made up of l' elements, and an arithmetic unit 300. In operation, l-element vector data A(1-l) and B(1-l) in the main storage 100 are read out to the vector registers 200-1 and 200-2 so that a necessary computation is performed for these data elements by the arithmetic unit 300, and the resultant vector data C(1-l) is fed through the vector register 200-3 and stored in the main storage 100. It may be possible for the, main storage 100 to have a fixed word length of 8 bytes for vector data elements so as to simplify the data structure. However, if the vector data element is made to have not only the 8-byte size, but for example the 4-byte size, a large scale vector data can be handled by a main storage of the same capacity, and such capability is strongly desired. In the case of reading out vector data elements in different size (e.g., 4-byte data and 8-byte data) in the main storage 100 into the vector registers for computation, the following problems as will be described in connection with FIG. 2.

In FIGS. 2a to f, reference number 100 denotes a main storage and 200-1 denotes a vector register. It is assumed that the elements of the vector register have a data size of 8 bytes, vector data stored in the main storage has a data size of 8 bytes, and an address of data in the main storage is given on a byte basis. Assumption is also made that vector data is stored in the main storage with the following address format. Namely, the leading element (the first element) is addressed directly, but the following elements are pointed to in terms of the incremental address given on a byte basis relative to the preceding element. In FIG. 2, (a) and (b) show the operations of reading out 8-byte vector data stored in the main storage 100 into the, vector register 200-1 and then inputting the data to the arithmetic unit 300. In case (a), vector data is stored continuously in the main storage 100 with an address increment of 8 for each element, while in case (b), vector data has an address increment of 16 and the elements are stored in every two locations of the main storage. In both cases, vector data read out from the main storage to the vector register can be fed in order without any manipulation (e.g., shift operation). Cases (c) and (d) are transfer operations for vector data with a data size of 4 bytes for each element. In case (c), the elements have an address increment of 4 and are stored continuously in the main storage, allowing the main storage to read out two elements in a pair as 8-byte data. In this method, the first and second elements of vector data may be read out into the left and right halves of the first element of the vector register as shown in the figure. In case (d) where the address increment is 20, odd-numbered elements are read out into the left halves of the elements of the vector register and even-numbered elements are read out into the right half of a vector register as effective 4-byte data, as shown in the figure. In the cases of (c) and (d), when vector data read out into the vector register is to be inputted to the arithmetic unit in left-justified and in the ascending order of the element number, there arise problems:

Different treatment is needed for updating the vector register read counter for the case of 4-byte vector data elements with the continuous vector data element address and for other cases, resulting in a complicated updating operation for the counter.

In the case of 4-byte data, information of whether 8-byte data of one element of the vector register contains two effective 4-byte data or one, and for the latter case whether the data is located in the right half or left half is needed by the vector register controller, and moreover, a circuit for taking out 4-byte data from 8-byte data is needed, causing the vector register controller to be complex. Thus, the complex vector register controller takes an extra time for transferring data from the vector register toe the arithmetic unit, and the register controller needs increased hardware.

The foregoing cases of FIGS. 2(a) through 2(d) are of the transfer of vector data elements one by one to the arithmetic unit irrespective of the data size of vector data, whereas for the data size of 4 bytes it is possible to transfer two elements in a pair to the arithmetic unit and carry out the computations for the two elements concurrently as shown by (e) and (f). In these cases, in addition to the foregoing problems, two vector data read out of two adjacent elements of the vector register need to be merged in accordance with information on how effective 4-byte data is stored, and complicated control is required for this purpose. It should be noted in FIGS. 2(e) and 2(f) that the unit 300 includes two arithmetic units.

In order for vector data to be read out from the main storage and transferred in order in a predetermined format to the arithmetic unit, the above-mentioned complicated data manipulation is needed. And, if this data manipulation is to be done while it is transferred from the vector register to the arithmetic unit, a complex control circuit must be provided for each of the vector registers, and in addition, due to the complex vector register control circuit, reading-out of vector data from the vector register into the arithmetic unit takes a long time, making it difficult to speed-up the operation.

SUMMARY OF THE INVENTION

Accordingly, it is an object of the present invention to provide a vector processor in which the arrangement of vector data elements is varied while vector data is read out from the main storage into a vector storage means so as to eliminate the need for the rearrangement of vector data elements when vector data is transferred from the vector storage means to the arithmetic unit, thereby simplifying the data processing after data has been stored in the vector storage means. The vector processor according to the present invention comprises a means for writing vector data elements read out from the main storage into separately-specified locations of the vector storage means, whereby when vector data in the main storage is read out into the vector register, vector data elements are written to locations determined such that the rearrangement for vector data elements is not needed when the vector data elements are transferred from the vector register to the arithmetic unit.

According to the present invention, in reading out vector data from the main storage and writing it into the vector data storage means for the case of a single arithmetic unit, vector data elements are written into words of the vector data storage means in a relevant positional arrangement for the words to be used as inputs to the arithmetic unit, and for the case of dual arithmetic units with words of the vector data storage means storing two vector data elements to be processed by the arithmetic units, the two vector data elements can be arranged in each word at invariable locations corresponding to the arithmetic units, whereby in both cases rearrangement for vector data elements is not needed when vector data is read out from the vector data storage means into the arithmetic unit(s), and thus vector computation can be speeded up.

By use of the inventive vector processor, 4-byte vector data stored in the main storage 100 in a manner, for example, as shown in FIG. 3(a), can be transferred to the vector register 200-1 in a left-justified fashion in each word as shown in the figure, so that rearrangement of vector data is not needed when it is read out of the vector register 200-1 and inputted to the arithmetic unit 300 as can be seen in the figure. The same result is obtained when vector data is arranged in the main storage as shown in FIG. 3(b). In the case of inputting two vector data elements to the arithmetic unit concurrently, e.g., when 4-byte data is stored in the main storage 100 as shown in FIG. 3(c), the vector data can be stored in the vector register 200-1 as shown in the figure, so that rearrangement of vector data is not needed when it is transferred from the vector register 200-1 to the arithmetic unit 300. The same result is obtained when the vector data elements are stored in the main storage 100 as shown in FIG. 3(d).

BRIEF DESCRIPTION OF THE DRAWINGS

These and other objects of the invention will be seen with reference to the description taken in conjunction with the accompanying drawings, in which:

FIG. 1 is a brief systematic diagram of a prior art vector processor;

FIG. 5 is a diagram showing the request order format used in the processor shown in FIG. 4;

FIGS. 6a-6c are timing charts showing the operation of the processor shown in FIG. 4;

FIG. 10 is a table explaining the multiples to be generated by the increment multiple generator shown in FIG. 9.

DETAILED DESCRIPTION OF THE PREFERRED EMBODIMENTS

Figure 4:
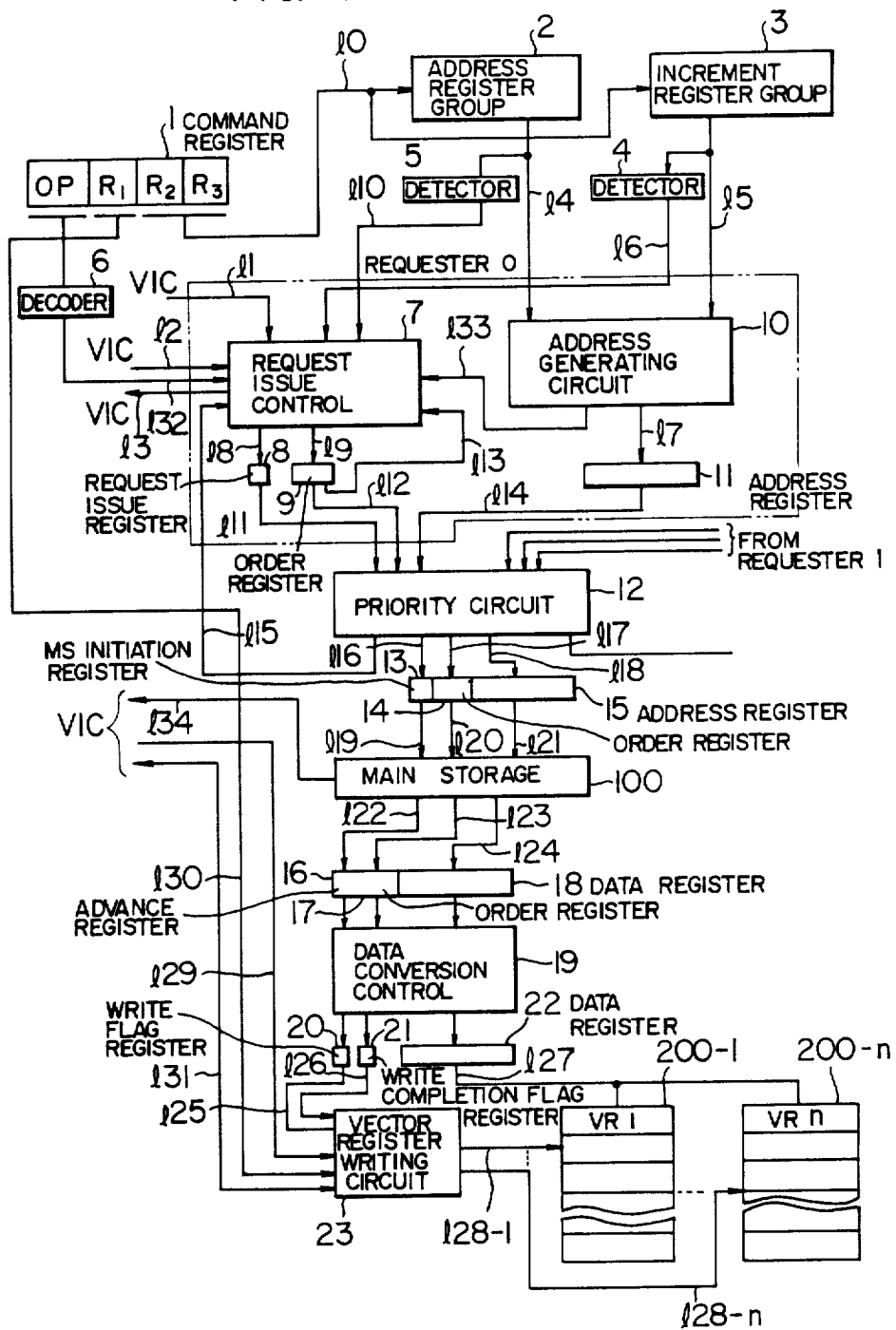
FIG. 4 is a block diagram of the vector processor embodying the present invention.

A preferred embodiment of the present invention will now be described. In FIG. 4 showing one embodiment of the present invention, the circuit arrangement includes a command register 1, an address register group 2, an increment register group 3, a detection circuit 4 for determining whether or not vector data elements have an address increment of 4, a detection circuit 5 for determining whether or not the address bound is located at the fourth byte in an 8-byte word, a command decoder 6, a request issue control circuit 7, a request issue register 8, an order register 9, an address generating circuit 10, an address register 11, a priority circuit 12, an MS (main storage) initiation register 13, an order register 14, an address register 15, an advance register 16, an order register 17, a data register 18, a data conversion control circuit 19, a write flag register 20, a write completion flag register 21, a data register 22, a vector register writing circuit 23, a main storage 100, vector registers 200-1 through 200-n, and signal lines 10 through 127, 128-1 through 128-n, and 129 through 134.

Figure 2:
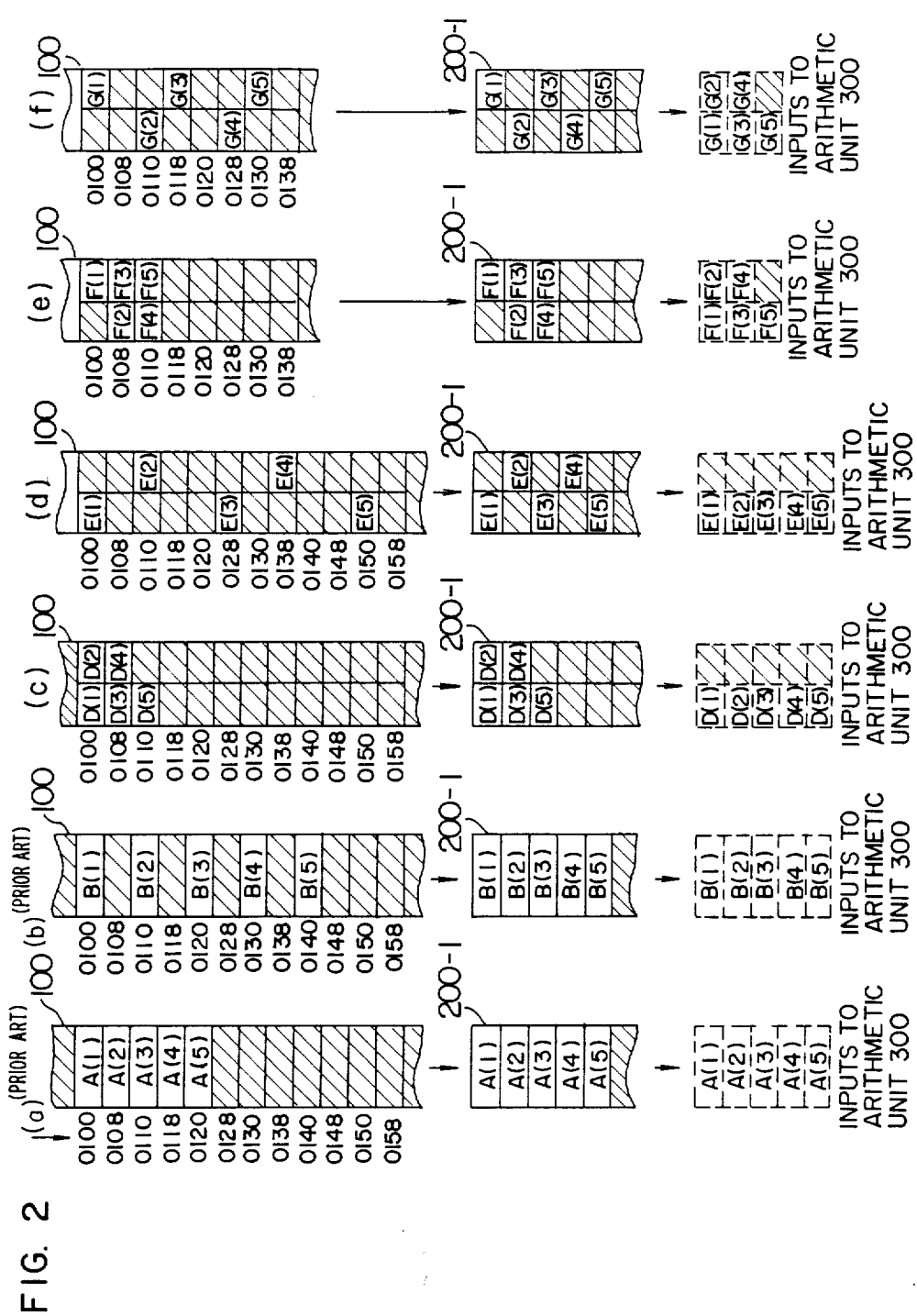
FIGS. 2(a) and 2(b) are diagrams explaining the manner of storing 8-byte vector data elements in the prior art vector register.
FIGS. 2(c)-2(f) are diagrams explaining the manner of storing 4-byte vector data, elements in the vector register and the problems the present invention addresses.

Referring to FIG. 4, the operation of reading vector data A(1)-A(5) shown in FIG. 2(a) from the main storage 100 and writing them into the vector register 00-1 will first be described. A vector instruction control (VIC) circuit (not shown) transfers an initiation signal to the request issue control circuit 7 and vector register write circuit 23 through the signal lines 12 and 129, respectively. At the same time, the VIC circuit informs the request issue control circuit 7 of the number of vector data elements to be processed through the signal line 11. The decoder 6 decodes the OP code of a vector command in the command register 1 and informs the request issue control circuit 7 of the data size of each vector data element through the signal line 132. The data size is obtained by decoding a vector command read out from the main storage 100 through the line 134. The signal line 132 gives "1" when the command specifies 4-byte vector data, while it gives "0" for specifying 8=byte data. In the example of FIG. 2(a), the signal line 132 gives "0" for the 8-byte command. The vector register number (200-1) of a register for receiving read-out data, indicated by register field $R_1$ of vector command in command register 1 is transferred to the vector register writing circuit 23 through the signal line 130. Furthermore, the address register number of the address register group 2 and information for specifying an increment register out of the increment register group 3, which are indicated by register fields $R_2$ and $R_3$ of the vector command in the command register 1, are sent to these register groups through the signal line 10. The address register group 2 is a group of address registers which hold the addresses of the leading elements of vector data stored in the main storage, and the increment register group 3 is a group of increment registers which hold address increments between adjacent elements, from which the contents with register numbers specified through the signal line 10 are transferred over the signal lines 14 and 15 to the address generating circuit 10. At the same time when the leading element address and increment are transferred to the address generating circuit 10, the address of the leading element is entered to the detection circuit 5, which in turn determines whether or not the address bound is the fourth byte and informs the request issue control circuit 7. In this example, the starting address is 0100 (in hexadecimal notation) and the starting address is not the 4th-byte bound, therefore, the detection circuit 5 sends "0" over the signal line 110. The detection circuit 4 receives the increment to check whether it is 4 or not, and sends "1" if the increment is 4, or otherwise sends "0" over the signal line 16 to the request issue control circuit 7. Since the increment is 8 in this example, "0" is sent over the signal line 16.

Figure 6B:
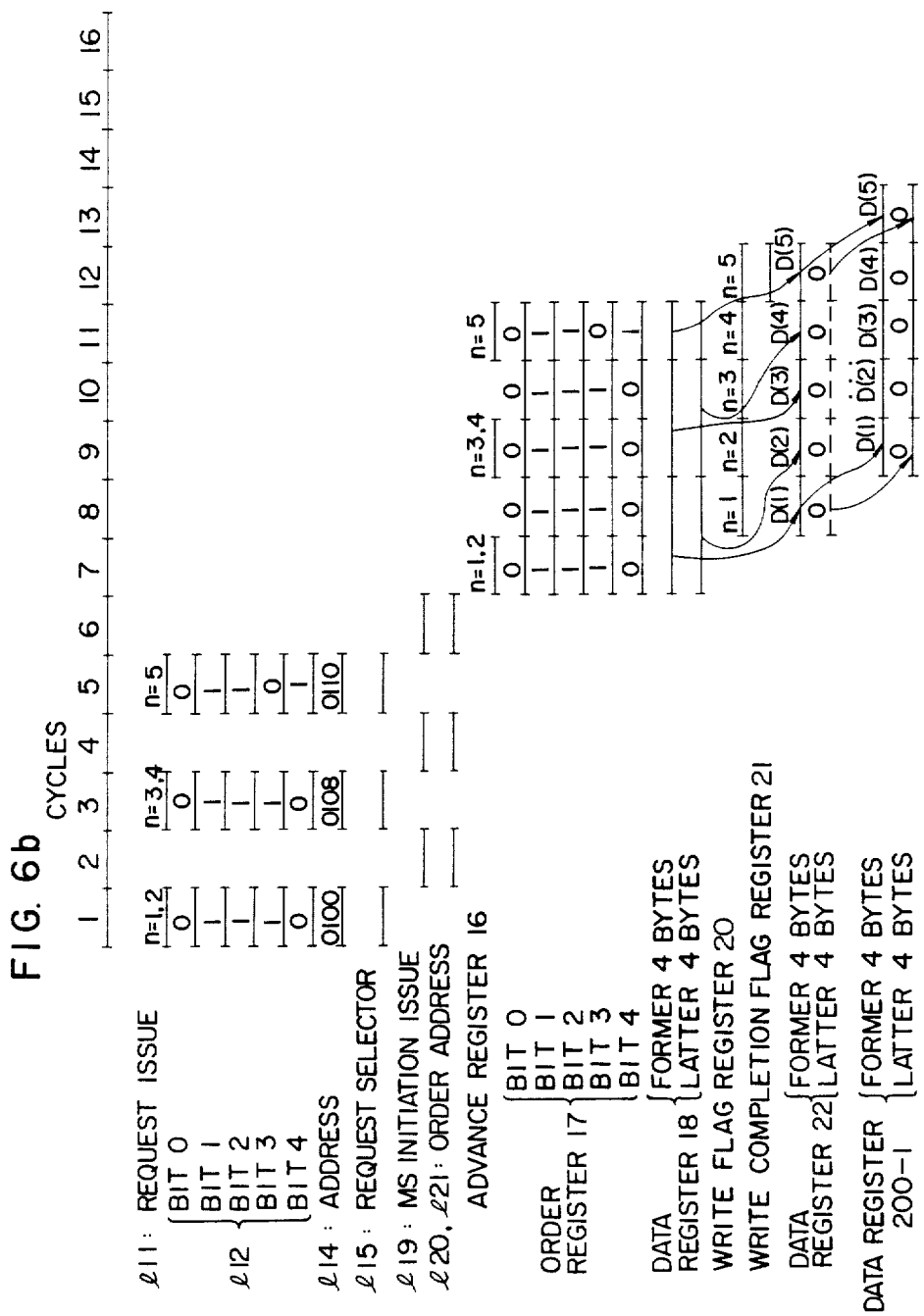

On completion of the foregoing preprocessing, the read operation of the main storage 100 starts. The procedure of this process will be described with reference to the timing chart of FIG. 6a. FIG. 6a is a timing chart showing the states of the signals at several portions of the vector processor when vector data is read out from the main storage 100 into the vector register. In FIG. 6a and also in FIGS. 6b and 6c which will be referred to later, n=1, n=2, and so on indicate that vector data elements 1, 2, and so on are processed for reading, writing, and the like. Here, the first cycle is established as follows. Namely, the request issue register 8 generates requests for reading out data from the main storage 100 on the signal line (11 to the priority circuit 12 for each element of vector data A(1–5), and a time interval for issuing a request for the first element is defined to be the first cycle. In the first cycle, simultaneously with the issue of a request for the first element, a request order is sent from the order register 9 to the priority circuit 12 through the signal line 112 and a read address is sent from the address register 11 to the priority circuit 12 through the signal line 114. The request order has the format, for example, as shown in FIG. 5. In this case, a request order consists of 5 bits, and bit 0 designates a requester number. The term "requester" will refer to a portion enclosed by the dashed line in the upper section of FIG. 4. There can be provided a plurality of such requesters, and they are numbered. In the present arrangement, requester 0 and requester 1 are used, the former dedicated to reading and the latter to writing. Since requester 0 is used here, bit 0 of the request order takes "0". Bit 1 specifies the data size of a vector data, being "0" for a command specifying the 8-byte size, or "1" for a command specifying the 4-byte size. In this example, the data size is 8 bytes as shown in FIG. 2(a), and bit 1 takes "0". Bits 2 and 3 of the request order indicate the legality of data. The main storage 100 is accessed for a 8-byte word each time, and therefore, if the vector data element has a data size of 4 bytes, there are the case of two elements appearing in the 8-byte word, the case of one element filled in the former 4 bytes of the word, and the case of one element appearing in the latter 4 bytes of the word. Then, bit 2 takes "1" when the former 4 bytes of the word contain data, otherwise it takes "0", and bit 3 takes "1" when the latter 4 bytes of the word contain data, otherwise it takes "0". If the vector data element has a data size of 8 bytes, both the bits 2 and 3 take "1" as is the case shown in FIG. 2(a). Bit 4 is used to indicate the last request.

Requests which have been entered to the priority circuit 12 are selected in the same cycle, set to the MS initiation register 13 through the signal line 116, and then transferred as an MS initiation signal to the main storage 100 through the signal line 119 in the second cycle.

The priority circuit 12 also receives requests from requester 1. On this account, if the requesters contend with each other for the bank or the like, a request is selected in accordance with the priority order, and in this case a request may be selected in other cycle than the request input cycle. The present invention is based on the assumption that no other requester operates simultaneously, and thus a request is selected in the same cycle.

In synchronization with the MS initiation signal, an order is transferred to the main storage via the signal line 117, order register 14 and signal line 120, and an address is transferred to the main storage 100 via the signal line 118, address register 15 and signal line 121.

In the first cycle, a request for reading out the first element from the main storage 100 is selected by the priority circuit 12, and at this time a request signal indicating that a request has been selected is transferred through the signal line 115 to the request issue control circuit 7. Based on this signal, the request issue control circuit 7 sets a request and order for the second element to the request issue register 8 and order register 9 through the signal lines 18 and 19, respectively. In synchronization with this operation, an address from the address generating circuit 10 is set into the address register 11 through the signal line 17. The request, order and address for the second element are inputted to the priority circuit 12 in the second cycle through the same paths as for the first element. The remaining elements are processed sequentially in the same manner until the last request for the fifth element (A5), in the case of FIG. 2(a), is completed. Then, at the fifth cycle, bit 4 of the order entered to the priority circuit 12 through the signal line 112 becomes "1" for the first time. Bit 4 of the order for indicating the last request is also given to the request issue control circuit 7 through the signal line 113. With bit 4 of the order being "1", when the request issue control circuit 7 receives the request select signal from the priority circuit 12 through the signal line 115, the circuit 7 sends a completion report to the VIC through the signal line 13 in the next sixth cycle.

As shown in FIG. 6a, the order register 9 provides orders of 00110, 00110, 00110, 00110, and 00111 on the signal line 112 sequentially in the first through fifth cycles. The generation of these orders will be described in connection with FIG. 7.

Figure 7:
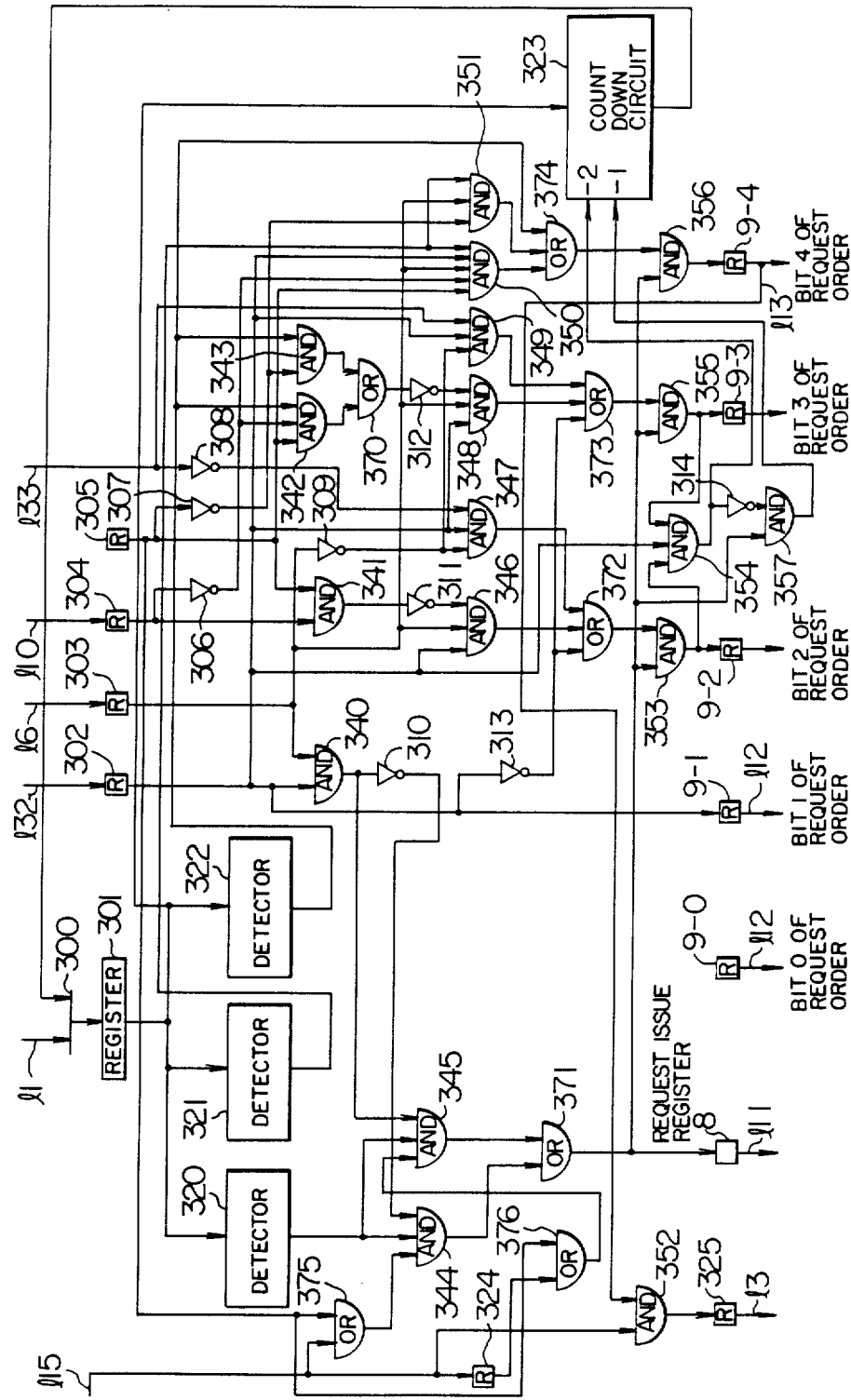
FIG. 7 is a schematic diagram showing in detail the request issue control circuit shown in FIG. 4.

FIG. 7 is a schematic diagram of the request issue control circuit 7. The circuit arrangement includes a selector 300, registers 301–305, 324 and 325, a request issuing register 8, registers 9–0 to 9–4 constituting bits 0 to 4 of the order register 9, inverters 306–314, AND gates 340–357, OR gates 370–376, detection circuits 320–322 receiving the contents of the register 301 and providing "1" when the input value is larger than zero, equal to 2 and equal to 1, respectively, and a countdown circuit 323 which receives the contents of the register 301 and substrates 2 or 1 from the input. The register 301 is loaded with a value of 5, the number of elements to be processed, through the signal line 11 and selector 300. The register 302 for storing information indicating the data size of each element is loaded from the decoder 6 through the signal line 132 with a value of 0 indicating the 8-byte data size. The register 303 for storing information on whether or not the address increment is 4 is loaded through the signal line 16 with 0 indicating that the increment is not 4. The register 304 for storing information on whether or not the starting address is located at the 4-byte bound is loaded by the detection circuit through the signal line 110 with 0 indicating that the starting address is not at the 4-byte bound. The register 305 is assumed to be set to 1 when the initiation signal is sent from a circuit (not shown), and reset to 0 when a first request is issued to the priority circuit 12. Signal line 133 originating from the address generating circuit 10 takes "1" when the address is at the 4-byte bound.

The following describes the procedures of generating orders in the cycles. Initially, the register 301 has a value of 5, causing the detection circuit 320 to output "1", the register 305 contains 1, causing the OR gate 375 to output "1", and the register 302 contains 0, causing the inverter 310 through the AND gate 340 to provide "1". Receiving these outputs, the AND gate 344 is enabled to output "1". This 1's output from the AND gate 344 is set to the request issuing register 8 through the OR gate 371, and a request for the first element is issued to the priority circuit 12 through the signal line 111 in the first cycle. At the same time, the content of the register 301 is entered to the countdown circuit 323 and it is decremented to become 4 when the AND gate 357 provides "1", and the register 301 is updated by the result through the selector 300. By provision of 1's output from the inverter 313, the register 9-2 is loaded with 1 through the OR gate 372 and AND gate 353, and the register 9 - 3 is loaded with 1 through the OR gate 373 and AND gate 355.

Since requester 0 is used in this example, the register 9-0 is made to have a fixed value of 0 by a circuit (not shown). The register 9-1 contains 0 due to 0's output from the register 302. All of the AND gates 350 and 351 and detection circuit 322 provide "0", the OR gate 374 receiving these outputs provides "0", which is set to the register 9-4 through the AND gate 356.

Subsequently, during the second through fifth cycles, the registers 9-0 to 9-3 are loaded with 0011 via the similar signal paths. Although in the second and later cycles the register 305 is reset to 0, the request select signal which is sent from the priority circuit 12 through the signal line 115 becomes "1", causing the OR gate 375 to provide "1", and thus a request is issued. The register 9-4 is loaded with 0 during the second to fourth cycles, but in the fifth cycle it is loaded with 1 through the following process so as to define the last element. Namely, the contents of the register 301 are subtracted to become 1, causing the detection circuit 322 to provide "1", which is set to the register 9-4 through the OR gate 374 and AND gate 356.

In the sixth cycle, the contents of register 301 become 0 and the detection circuit 320 provides 0's output, so that the request issue register 8 is not set to 1 any longer, and a request is no longer sent to the priority circuit 12. Also in the sixth cycle, the register 325 is set to 1, and a completion report is delivered to the vector command control circuit 1 through the signal line 13. As soon as the MS initiation signal is transferred from the MS initiation register 13 to the main storage 100 through the signal line 119, the corresponding advance signal is sent from the main storage 100 through the signal line 122 and set into the advance register 16 on expiration of five cycles (although this embodiment takes an interval of five cycles, it is not limited to this value). In synchronization with the advance signal, the order of the corresponding element and 8-byte, data read out of the main storage 100 are loaded into the order register 17 and data register 18 through the signal lines 123 and 124, respectively. After the advance signal has been set into the advance register 16 (i.e., the advance register 16 is set to "1"), the data conversion control circuit 19 sets the write signal to the write flag register 20 and the write completion signal to the write completion flag register 21 when necessary on the basis of the order which has been loaded into the order register 17 on expiration of one cycle, and at the same time the circuit 19 loads the data register 22 with read-out data stored in the data register 18. Then, information stored in the write flag register 20 and write completion flag register 21 are transferred as a write signal and a write completion signal to the vector register writing circuit 23 through the signal lines 125 and 126, respectively. The write signal is transferred through the signal line 128-1 to the vector register 200-1 so that it is used for setting write data transferred on the signal line 127. When the vector register writing circuit 23 receives the write completion signal on the signal line 126 (in the 12th cycle in FIG. 6a), it transfers the completion signal to the VIC through the signal line 131 upon completion of its circuit operation in the next cycle.

Figure 3:
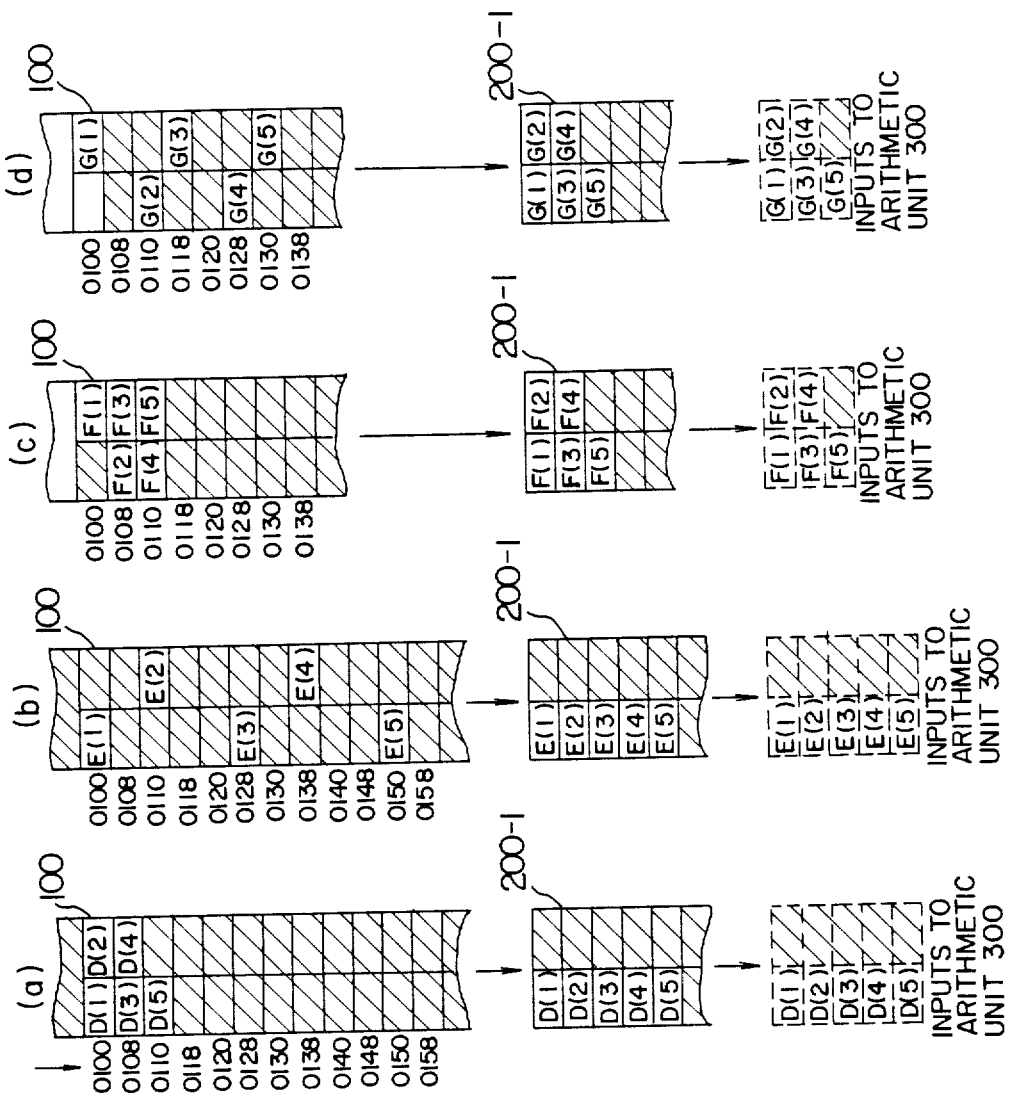
FIGS. 3(a)-3(d) are diagrams explaining the manner of storing 4-byte vector data elements in the vector register according to the present invention.

The data conversion circuit 19 effects rearrangement of vector data elements in the arrangement of the word of the main storage, which have been read out from the main storage 100 to the data register 18, into a new positional arrangement adaptive to entry to the arithmetic unit 300 on the basis of the order (shown in detail in FIG. 5) which has been generated by the request issue control circuit 7 and loaded into the order register 17 via the order register 9, and then loads the rearranged vector data elements to the data register 22. Rearrangement of vector elements does not take place in the case of FIG. 2(a), whereas in the cases of FIGS. 3(a) and 3(b) as will be described in connection with the timing charts of FIGS. 6b and 6c, rearrangement is effected for vector data elements by the data conversion circuit 19 in accordance with respective orders.

Figure 8:
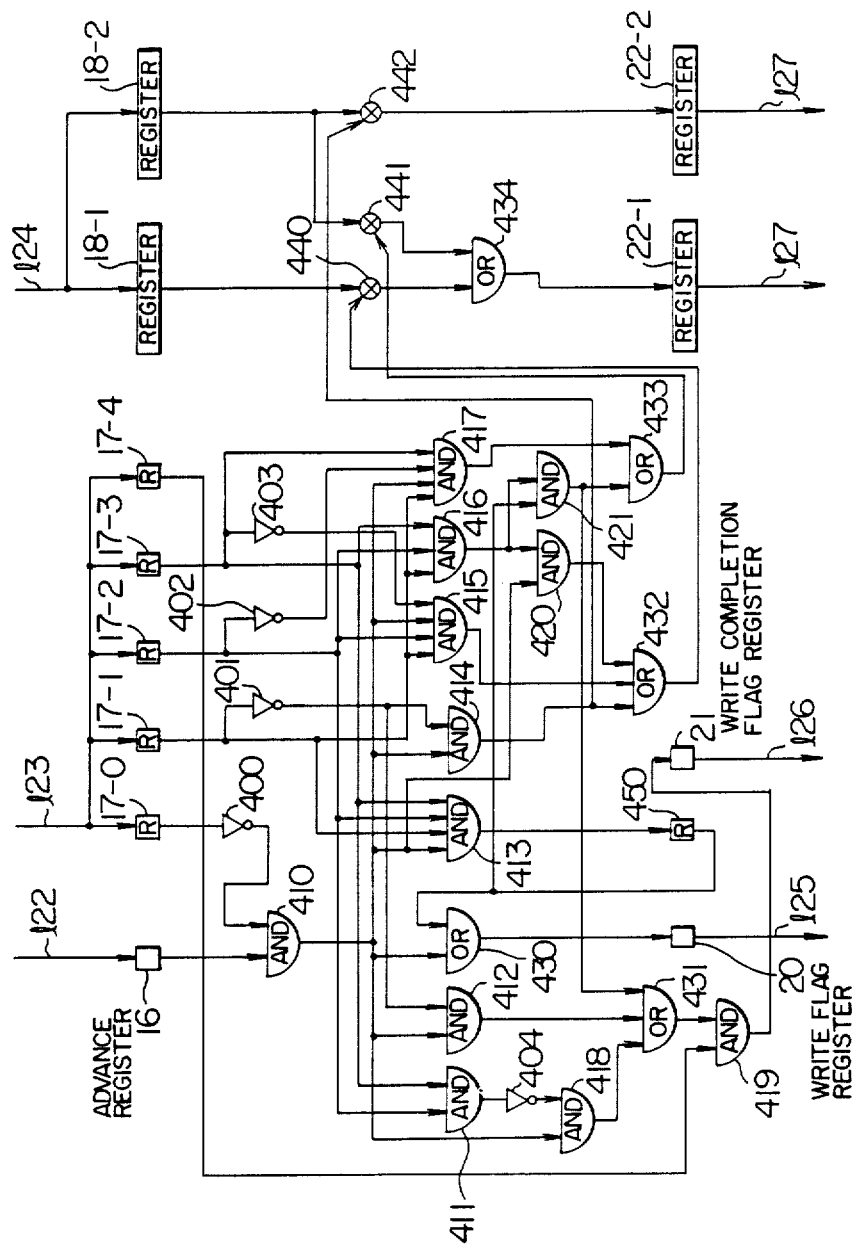
FIG. 8 is a schematic diagram showing in detail the data conversion control circuit shown in FIG. 4.

FIG. 8 is a schematic diagram of the data conversion control circuit 19. The circuit arrangement includes an advance register 16, registers 17-0 to 17-4 constituting bits 0 through 4 of the order register 17, a register 18-1 constituting the former 4 bytes of a data register 18, a register 18-2 constituting the latter 4 bytes of the data register 18, the write flag register 20, the write completion flag register 21, a register 22-1 constituting the former 4 bytes of a data register 22, a register 22-2 constituting the latter 4 bytes of the data register 22, a register 450, inverters 400-404, AND gates 410-421, OR gates 430-434, and gate circuits 440-442.

The operation of the data conversion control circuit 19 will be described for the case of FIG. 2(a) which is given the timing chart in FIG. 6a. At the same time when the advance register 16 is loaded with 1 indicating the advance of the first element in the seventh cycle, the registers 17-0 through 17-4 are loaded with 00110 and registers 18-1 and 18-2 are loaded with read-out data. Then, the AND gate 410 provides "1", which is set to the write flag register 20 through the OR gate 430 in the eighth cycle, and a write signal is transferred through the signal line 125 to the vector register writing circuit 23. Since the register 17-4 contains 0, the AND gate 419 provides "0" to reset the write completion flag register 21 to 0. The AND gate 41 provides 1l's output to enable the gate 440 through the OR gate 432, and enables the gate 442 through the OR gate 433, so that read-out data of the first element stored in the registers 18-1 and 18-2 are loaded to the registers 22-1 and 22-2, respectively, in the eighth cycle and transferred to the vector register 200-1 through the signal line 127.

The same process takes place for the second through fifth elements, and the register 17-4 is set to 1 in synchronization with the advance of the fifth element. At this time, a 1's output provided by the AND gate 412 is delivered to the AND gate 419 through the OR gate 431, and by receiving the 1's output from the register 17-4 at its other input the AND gate 419 provides 1's output to set the write completion flag register 21 to 1, and then the write completion signal is sent out over the signal line 126 in the 12th cycle.

Next, the operation of reading out vector data D(1-5) from the main storage 100 and writing the data into the vector register 200-1, as illustrated in FIG. 3(a), will be described in connection with the schematic diagrams of FIGS. 4, 7 and 8 and the timing chart of FIG. 6b. The processes prior to the operation of the request issue control circuit 7 take the same procedures as in the foregoing example of FIG. 2(a). In this example, the number of elements to be processed is 5, the vector register for storing read-out data is the vector register 200-1, the leading element address of the vector data is 0100, the address increment is 4, and the data size of each vector data element is 4 bytes. Accordingly, in FIG. 7, the register 301 for storing the number of elements to be processed is loaded with the number 5, the register 302 is set to 1 indicating that the data size is 4 bytes, the register 303 is set to 1 indicating the address increment to be 4, the register 304 is set to 0 indicating that the leading element address is not at the 4-byte bound (but at the 8-byte bound), and the register 305 is set to 1 (it is reset to 0 when a request is sent out over the signal line 111).

First, the operation of the request issue control circuit 7 will be described in connection with FIG. 6b and FIG. 7. The contents of the register 301, i.e., 5, are entered to the detection circuit 320. Since the input is larger than 0, the detection circuit 320 provides "1" for the AND gate 345. A 1's output of the register 305 is given through the OR gate 376 to the AND gate 345, which also receives "1" from the AND gate 340, causing the AND gate 345 to be enabled by three 1's inputs to provide a 1's output. This 1's output is set to the request issuing register 8 through the OR gate 371 in the first, cycle, and a request is issued to the priority circuit 12 through the signal line 111. At the same time, a 1's output from the AND gate 346 is set through the AND gate 353 to the register 9-2 containing bit 2 of the order, and a 1's output from the AND gate 348 is set through the OR gate 373 and AND gate 355 to the register containing bit 3 of the order. In addition, the register 9-0 for containing bit 0 of the order is loaded with 0 (always 0 since requester 0 is used), the register 9-1 for containing bit 1 of the order is loaded with 1, and the register 9-4 for containing bit 4 of the order is loaded with 0 by the OR gate 374 which receives 0's as outputs from the detection circuits 321 and 322. Furthermore, the contents of the register 301, i.e., 5, are entered to the count-down circuit 323, which are subtracted by 2 by virtue of a 1's output from the AND gate 354, and the resultant 3 is reloaded to the register 301. The reason for the subtraction by 2 is that two elements, that is, the first and second elements are included in one memory request.

Subsequently, the request issue control circuit 7 receives the request select signal through the signal line 115 for the request which has been sent to the priority circuit 12 in the first cycle, but in contrast to the case of FIG. 6a the AND gate 344 does not provide a 1's output, and thus the next request is not set to the request issuing register 8 in the second cycle.

In the case of FIG. 6b, this select signal is set by the register 324 in the second cycle and., based on this, the second request is issued in the third cycle. Namely, the select signal which has been set in the register 324 in the second cycle is set in the request issuing register 8 in the third cycle and it is transferred to the priority circuit 12. Here, a 1's output of the register 324 is delivered through the OR gate 376 to the AND gate 345, the request issuing register 8 is loaded with the same request through the same signal path as before in the third cycle, and the registers 9-0 to 9-4 are loaded with order bits. In this case, the third and fourth elements are read out from the main storage 100 by one single read operation, i.e., single request so that requests for the third and fourth elements are issued at one time, and therefore, the input of 3 to the count-down circuit 323 is subtracted by 2 and the resultant 1 is set to the register 301.

Subsequently, the select signal for the second request is set by the register 324 in the fourth cycle and, based on this, the third request is issued in the fifth cycle. Different from the cases of the first and second requests, 0 is set to the register 9-3 through the process that the detection circuit 322 for detecting the 1's output of the register 301 provides "1", causing the AND gate 343 to output "1" and this output through the OR gate 370 is inverted by the inverter 132, and its 0's output causes the AND gate 348 to output "0" ("1" in the cases of the first and second requests) and this "0" is set to the register 9-3. Namely, the latter 4 bytes of 8-byte data read out from the main storage 100 by the third request are unused and invalidated. In addition, the above-mentioned 1's output from the detection circuit 322 is set to the register 9-4 through the AND gate 356 so as to indicate the last request.

Subsequently, in the sixth cycle, the register 325 is set to 1, and the completion report is sent over the signal line 13 to the VIC.

Next, the operation of the data conversion control circuit 19 will be described in connection with FIG. 6b and FIG. 8. In the seventh cycle, the advance is transferred from the main storage 100 to the advance register 16 through the signal line 122, the order is transferred through the signal line 123 to the registers 17-0 through 17-4, the former 4 bytes of 8-byte read-out data are transferred to the register 18-1, and the latter 4 bytes thereof are transferred to the register 18-2 through the signal line 124,. It is assumed that setting to the registers 17-0 through 17-4, 18-1 and 18-2 takes place only when the advance is sent out.

The AND gate 410 provides a 1's output to set the write flag register 20 through the OR gate 430 in the eighth cycle, and the AND gate 413 provides a 1's output to set the register 450 to 1. Furthermore, the AND gate 416 provides a 1's output through the AND gate 420 and OR gate 432 to enable the gate circuit 440, the contents of the register 18-1 are transferred through the OR gate 434 to the register 22-1 in the eighth cycle, the gate circuits 441 and 442 are kept disabled, and the register 22-2 is set to zero.

Although in the eighth cycle the advance is not set in the advance register 16, the register 450 contains 1, causing the write flag register 20 to be set to 1 through the OR gate 430 in the ninth cycle. At this time, the register 450 is set to 0 by the 0's output of the AND gate 410. By the 1's output from the OR gate 433, only the gate circuit 441 is enabled, causing the contents of the register 18-2 to be set to the register 22-1 in the ninth cycle. Namely, the write signal is transferred through the signal line 125 to the vector register writing circuit 23 in the eighth and ninth cycles, and at this time the former 4 bytes of the read-out 8-byte data are transferred in the eighth cycle, and the latter 4 bytes are transferred in the ninth cycle. In this way, each vector data element which has been set in the registers 18-1 and 18-2 in accordance with the order from the order register 17 is read out sequentially into the register 22-1, and then written into the register 200-1 through the signal line 127.

In the ninth cycle, the advance register 16 is loaded with a new advance, and the process is identical to the previous case. Finally, in the 11th cycle, the advance is set, and the order at this time is 01101. In the 12th cycle, the write flag register 20 is set to 1, and since the register 17-3 contains 0, the AND gate 413 provides a 0's output to set the register 450 to 0. At the same time, the AND gate 415 provides a 1's output for the gate circuit 440 through the OR gate 432, and then the contents of the register 18-1 are set to the register 22-1. The gate circuits 441 and 442 are not enabled, and all zero is set to the register 22-2. Furthermore, the AND gate 418 provides 1's output to set the write completion flag register 21 to 1 through the OR gate 431 in the 12th cycle for the first time, and the process completion report is delivered through the signal line 126 to the vector writing circuit 23.

Finally, the operation of reading out vector data E(1-5) from the main storage 100 and writing it into the vector register 200-1 will be described in connection with FIG. 6c, FIG. 7 and FIG. 8. In this case, the number of elements to be processed is 5, the leading element address is 0100, the address increment is 20, and the data size of each element is 4 bytes, then the register 301 is loaded with the number 5, which is the number of elements to be processed, the register 302 is set to 1 indicating the data size to be 4, the register 303 is set to 0 indicating that the address increment is other than 4, the register 304 is set to 0 indicating that the leading element address is not at the 4th-byte bound (but at the 8th-byte bound), and the register 305 is set to 1 (set to 0 if a request is sent out). The operation of the request issue control circuit 7 shown in FIG. 7 resembles the case of FIG. 2(a), but differs in the following points. Namely, generation of bits 2 and 3 of the order to be set to the registers 9-2 and 9-3 differs as follows. By receiving from the address generating circuit 10 through the signal line 133 "1" if the address corresponding to each element is at the 4-byte bound, or by receiving "0" if the address is at the 8-byte bound, bit 2 is obtained from the output of the AND gate 347 and bit 3 is obtained from the output of the AND gate 349.

The operation of the data conversion control circuit 19 shown in FIG. 8 also resembles the case of FIG. 2(a), but differs in the following points. Namely, depending on the values set in the registers 17-2 and 17-3, if the register 17-2 contains 1 (0 for the register 17-3), the AND gate 415 provides a 1's output, enabling the gate circuit 440 through the OR gate 432, so that the contents of the register 18-1 is set to the register 22-1. The gate circuit 442 is disabled and the register 22-2 is set to zero. If the register 17-3 contains 1 (0 for the register 17-2), the AND gate 417 provides a 1's output, enabling the gate circuit 441 through the OR gate 433 to set the contents of the register 18-2 to the register 22-1, and all zeros are set to the register 22-2.

Figure 9:
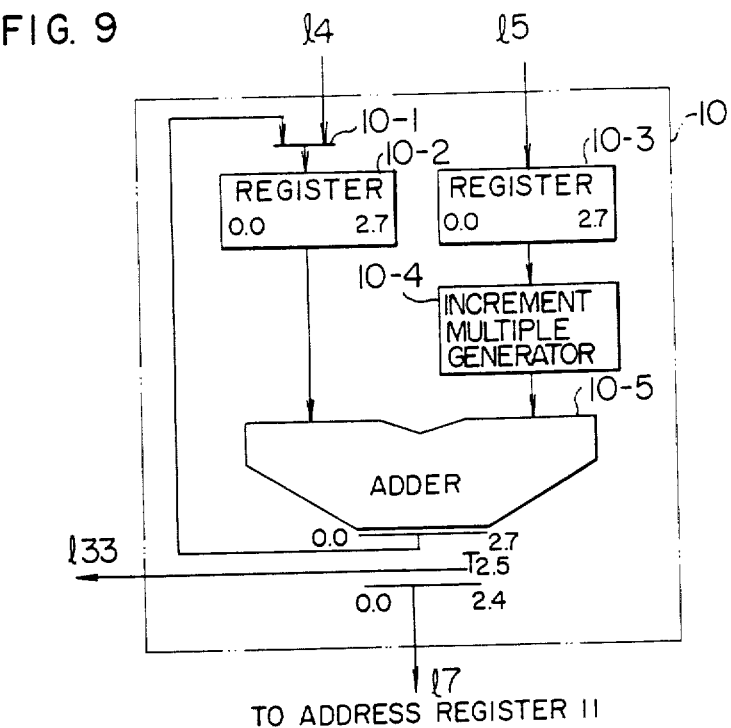
FIG. 9 is a block diagram of the address generator shown in FIG. 4.

Next, the address generating circuit 10 will be described in detail. FIG. 9 exemplifies the arrangement of the address generating circuit 10, and the circuit includes a selector 10-1, registers 10-2 and 10-3, an increment multiple generator 10-4, and an adder 10-5. Prior to the address generation, the leading element address is set to the register 10-2 through the signal line 14 and selector 10-1, and the address increment for adjacent elements is set to the register 10-3 through the signal line 15. Then, in synchronization with the issuing of a request to the priority circuit 12 by the request issue control circuit, the address is generated in the following manner. This example of arrangement is based on the assumption that the registers 10-2 and 10-3 and adder 10-5 have a data size of 3 bytes (bit positions 0.0–2.7), and the address is expressed in byte basis.

In case each vector data element has a data size of 8 bytes, or in case each element has a data size of 4 bytes and an address increment other than 4 (i.e., 4-byte data are not stored continuously in the main storage), the address for the first request is the leading element address itself which has been set initially in the register 10-2. Then, the increment multiple generator 10-4 generates a 0's multiple for the increment set in the register 10-3 and supplies it to the adder 10-5, which receives at its another input the contents of the register 10-2 and transfers the result to the address register 11 through the signal line 17. At this time, if the main storage 100 is read in 8-byte basis, bit positions 2.5–2.7 of the address provided at the output of the adder 10-5 will be ignored.

In another case where each element has a data size of 4 bytes (the address increment is other than 4), bit positions 2 and 5 of the address are transferred over the signal line 133 so as to inform the request issue control circuit 7 of whether the address is at the 4-byte bound. The addresses for the second and later requests are obtained by adding a 1's multiple of the increment to the contents of the register 10-2 y the adder 10-5 sequentially. At this time, the resultant address produced by the adder 10-5 is saved to the register 10-2 through the selector 10-1 as it is needed in address generation for the next request.

In case each vector data element has a data size of 4 bytes and an increment of 4, the address generation differs as follows depending on whether the address of the leading element is located at the 4-byte bound or 8-byte bound. In case the leading element address is at the 4-byte bound, the address of the first request will be the leading element address subtracted by the increment (−1's multiple of the increment is generated by the multiple generator 10-4 and supplied to the adder 10-5), and the addresses for the second and later requests are obtained by adding the doubled increment to the address of the first request sequentially. In case the address of the leading element address is at the 8-byte bound, the address for the first request is the leading element address itself (0's multiple of the increment is generated by the multiple generator 10-4 and supplied to the adder 10-5), and the addresses for the second and later requests are obtained by adding the doubled increment to the leading element address sequentially. FIG. 10 summarizes the multiples of increment produced by the increment multiple generator 10-4.

Figure 11:
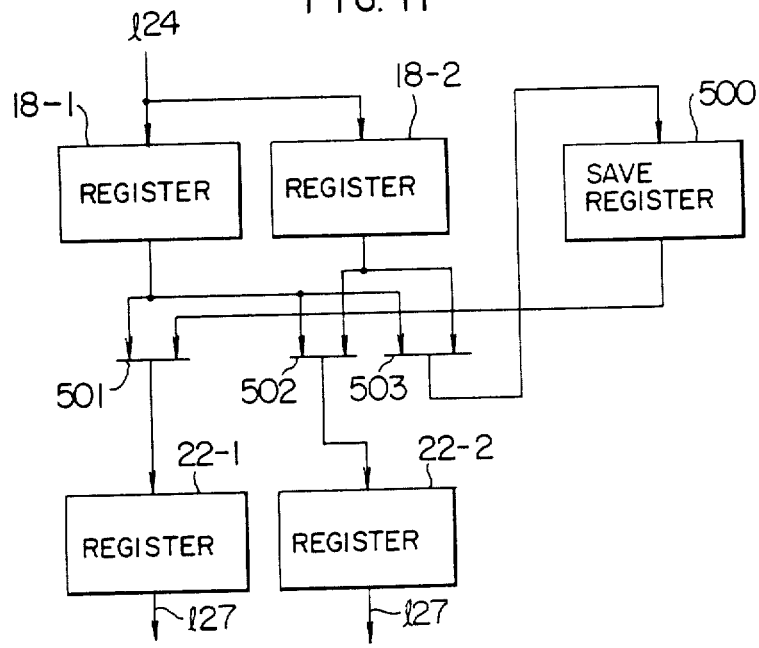
FIG. 11 is a block diagram showing another embodiment of the data conversion control circuit shown in FIG. 4.

FIG. 11 shows another embodiment of the data conversion control circuit. The arrangement includes a saving register 500 and selectors 501–503. The remaining portions which are common to those of FIG. 8 are omitted. The following describes with reference to FIG. 8 how this embodiment achieves the operations for cases (c) and (d) of FIG. 3.

First, the case of FIG. 3(c) will be treated. Data F(1) is loaded into the register 18-2 in synchronization with the first advance from the main storage 100. It is assumed that the discrimination on whether 8-byte data transferred through the signal line 124 contains two 4-byte data or only one, and the discrimination for the latter case on whether it is placed at the former or latter half of the word are implemented on the basis of the order transferred in synchronization with the advance as mentioned previously. After one cycle following the arrival of the advance, data F(1) is loaded temporarily into the saving register 500 via the selector 503. After the registers 18-1 and 18-2 have been loaded with data F(2) and F(3), respectively, in synchronization with the second advance, data F(1) in the register 500 is transferred via the selector 501 to the register 22-1, data F(2) in the register 18-1 is transferred via the selector 502 to the register 22-2, and data F(3) in the register 18-2 is transferred via the selector 503 to the register 500 in the next cycle. Then, in the subsequent cycle, F(1) in the register 22-1 and F(2) in the register 22-2 are written into the vector register.

After the registers 18-1 and 18-2 have been loaded with F(4) and F(5), respectively, in synchronization with the third (last) advance, F(3) in the register 500 is transferred via the selector 501 to the register 22-1, the contents of register 18-1 are transferred via the selector 502 to the register 22-2, and the contents of the register 18-2 are transferred via the selector 503 to the register 500 in the next cycle. Simultaneously with the writing of F(3) of the register 22-1 and F(4) of the register 22-2 into the vector register in the next cycle, F(5) in the register 500 is loaded to the register 22-1 and then written into the vector register in the next cycle to complete the process. In this case, the advance from the main storage 100 may be sent out in continuous cycles, so that the request issue control circuit 7 can issue requests to the priority circuit 12 in continuous cycles.

Next, the case of FIG. 3(d) will be described. After the register 18-2 has been loaded with data G(1) in synchronization with the first advance, it is transferred via the selector 503 to the register 500 in the next cycle. After the register 18-1 has been loaded with data G(2) in synchronization with the second advance, G(1) in the register 500 is transferred via the selector 501 to the register 22-1, and G(2) in the register 18-1 is transferred via the selector 502 to the 22-2, and then they are written into the vector register in the next cycle. G(3) and G(4) are processed identically, whereas for the last data G(5), when the corresponding advance is transferred, G(5) stored in the register 18-2 is transferred directly via the selector 501 to the register 22-1 without going through the register 500 in the next cycle, and then is transferred to the vector register.

Although the embodiments have been described for the cases of the main storage and vector data elements being in 8-byte width and vector data in 4-byte or 8-byte width, the present invention is not limited to these data sizes, but the invention is generally applicable to the arrangement with a main storage capable of reading out $l_1$-byte data, elements of a vector storage means having a data size of $l_2$-bytes, and the vector storage means writing m-byte vector data elements sequentially.

We claim:

1. A vector processor comprising:
   main storage having storage locations for storing vector elements of length m with a predetermined relative positional arrangement in said storage locations, and including means responsive to a read request for reading out data of length $l_1$ beginning from one of a plurality of specified address bounds which are separated by a length $l_1$;
   vector data storage means comprising a plurality of vector registers each having a plurality of data storage areas, each data storage area having a width $l_2$, for storing vector data;
   means for providing read requests to said main storage means for sequentially reading out a plurality of data of length $l_1$ from said main storage means, each data of length $l_1$ including at least two vector elements of length m (where $l_1/m$ is an integer which is larger than 1 and $l_2$ is larger than or equal to m); and means for writing the vector elements, included in said read-out plurality of data of length $l_1$, into said plurality of data storage areas in each of said vector registers of the vector data storage means, so that respective vector elements of length m are positioned in the data storage areas of a vector register at predetermined positions which are independent of said predetermined relative positional arrangement of said vector elements as stored in said main storage means, whereby said vector elements are stored in vector register in an order required for subsequent operations; and
   at least one arithmetic means coupled to receive vector elements from said vector data storage means for performing vector computation on the vector elements received from said vector data storage means, including means for providing computational results to be written into said vector data storage means.

2. A vector processor according to claim 1, wherein said reading means includes means for producing information indicating whether or not each portion of length m of each data of length $l_1$ read out from said main storage means includes a vector element of length m, on the basis of the starting address of the first vector element of the vector elements of length m, and the incremental difference between the addresses of two adjacent vector elements, and said writing means includes controlling means responsive to the information produced by said reading means for controlling where said one vector element of length m is to be written within one of said plurality of data storage areas of said vector data storage means.

3. A vector processor according to claim 2, wherein said reading means further includes means connected to said information producing means for transmitting said produced information together with a read request to said main storage means, and wherein said main storage means includes means for further transmitting said transmitted information together with data of length $l_1$ including at least one vector element in response to said read request to said controlling means so as to enable said controlling means to respond to said further transmitted information to control where said transmitted one vector element is to be written within one of said plurality of data storage areas of said vector data storage means.

4. A vector processor according to claim 1, wherein at least one of said data of length $l_1$ read out of said main storage means includes plural vector elements and wherein said writing means includes means for effecting re-arrangement of the plural vector elements included in said one data of length $l_1$ read out from said main storage means and for writing said vector elements into different data storage areas of said vector data storage means by controlling the relative positional arrangement of at least one vector element in said one data of length $l_1$.

5. A vector processor according to claim 4, wherein said reading means includes means for producing information indicating whether or not one vector element resides in each portion of length $m_1$ of one data of length $l_1$ read out from the main storage means; and means responsive to said produced information for prohibiting the sending of a read request to said main storage means, if said produced information indicates that said one data of length $l_1$ includes n vector data elements, for a duration of at least n cycles of the main storage means readout operation after a read request has been sent to said main storage means for the data of length $l_1$.

6. A vector processor according to claim 4, wherein said reading means includes means for producing information indicating whether a vector element of length m resides in each portion of length m each data of length $l_1$ read out from said main storage means on the basis of the starting address of the vector elements, and the incremented difference between the addresses of two adjacent vector elements; and said writing means includes controlling means responsive to said produced information for controlling into which data area and position within the data area each of the plural vector elements included in the data of length $l_1$ read out of the said main storage means is written in said vector data storage means, when the produced information indicates that the data of length $l_1$ includes plural vector elements.

7. A vector processor according to claim 6, wherein said information produced by said information producing means is transmitted together with said read request to said main storage means; and wherein said main storage means includes means for further transmitting said transmitted information together with one data of length $l_1$ in response to said read request to said designating means, so as to enable said controlling means to operate in response to said transmitted information.

8. A vector processor according to claim 1, wherein said writing means includes means for saving one vector element of plural vector elements included in each data of length $l_1$ read out from said main storage means, and means for writing said saved vector element of the plural elements together with another vector element of the plural vector elements included in the data of length $l_1$ subsequently read out from said main storage means within one of said plurality of data storage areas of said vector data storage means, after effecting positional arrangement of the one and another vector elements of the vector elements of each data of length $l_1$ and subsequent data of length $l_1$.

9. A vector processor according to claim 8, wherein said reading means includes means for producing information indicating whether a vector data element resides in each region of length m of data of length $l_1$ read out from said main storage means, on the basis of the starting address of the vector elements, and the incremental difference between the addresses of two adjacent vector elements, and said writing means includes controlling means responsive to said produced information for controlling into which data area and position within the data area each of the one and another vector elements included in each data of length $l_1$ is written in said vector data storage means and for controlling the timing of writing of each of the one and another vector elements when said produced information indicates that each data of length $l_1$ includes plural vector elements.

10. A vector processor according to claim 9, wherein said information produced by said information producing means is transmitted together with said read request to said main storage means, and wherein said main storage means includes means for further transmitting said transferred information together with the data of length $l_1$ in response to said read request to said controlling means within said reading means, so as to enable said controlling means to operate in response to said transferred information.

* * * * *